(12) United States Patent
Sakai (10) Patent No.: US 10,267,213 B2
(45) Date of Patent: Apr. 23, 2019

(54) COMBUSTION CHAMBER STRUCTURE OF SPARK-IGNITION INTERNAL COMBUSTION ENGINE

(71) Applicant: TOYOTA JIDOSHA KABUSHIKI KAISHA, Toyota-shi, Aichi-ken (JP)

(72) Inventor: Hiroyuki Sakai, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/107,959

(22) PCT Filed: Dec. 15, 2014

(86) PCT No.: PCT/IB2014/002775
§ 371 (c)(1),
(2) Date: Jun. 24, 2016

(87) PCT Pub. No.: WO2015/097515
PCT Pub. Date: Jul. 2, 2015

(65) Prior Publication Data
US 2016/0326947 A1    Nov. 10, 2016

(30) Foreign Application Priority Data

Dec. 26, 2013  (JP) ................................. 2013-268772

(51) Int. Cl.
*F02B 23/10* (2006.01)
*F02F 1/24* (2006.01)

(52) U.S. Cl.
CPC .............. *F02B 23/10* (2013.01); *F02F 1/242* (2013.01); *F02B 2023/106* (2013.01);
(Continued)

(58) Field of Classification Search
CPC .......... F02B 2023/106; F02B 2023/108; F02B 23/10; F02F 2001/241
See application file for complete search history.

(56) References Cited

U.S. PATENT DOCUMENTS

| | | | | |
|---|---|---|---|---|
| 4,508,073 A | * | 4/1985 | Hofbauer | ................ F02B 17/00 123/307 |
| 5,775,288 A | * | 7/1998 | Suzuki | .................. F02B 23/104 123/298 |

(Continued)

FOREIGN PATENT DOCUMENTS

| | | | | |
|---|---|---|---|---|
| JP | H02-215921 A | | 8/1990 | |
| JP | H0367015 A | * | 3/1991 | .............. F02B 23/08 |

(Continued)

OTHER PUBLICATIONS

Roger Bywater, "DFV 1967 to Toyota 2009—a remarkable tale of progress", Jul. 31, 2011 (Jul. 31, 2011), XP055175129, 'Race Engine Technology' Jun./Jul. 2011, URL:http://www.jagweb.com/aj6eng/ret/index.php [retrieved on Mar. 5, 2018].*

(Continued)

*Primary Examiner* — Sizo Vilakazi
*Assistant Examiner* — Kevin R Steckbauer
(74) *Attorney, Agent, or Firm* — Hunton Andrews Kurth LLP (57) ABSTRACT

A combustion chamber structure for a spark-ignition internal combustion engine includes a combustion chamber, an ignition plug, and a guide portion. The combustion chamber is configured to produce tumble flow that swirls in an axial direction of a cylinder. The ignition plug is disposed in a central portion of an upper wall of the combustion chamber. The guide portion protrudes from the upper wall of the combustion chamber, and is configured to guide airflow passing through the central portion of the combustion chamber in an intake-exhaust direction of the combustion chamber while dispersing the airflow around the guide portion.

2 Claims, 12 Drawing Sheets

(52) U.S. Cl.
CPC ... *F02B 2023/108* (2013.01); *F02F 2001/241* (2013.01); *Y02T 10/125* (2013.01)

(56) References Cited

U.S. PATENT DOCUMENTS

| | | | | |
|---|---|---|---|---|
| 5,806,482 | A * | 9/1998 | Igarashi | F02B 17/005 123/259 |
| 5,979,399 | A * | 11/1999 | Piock | F02B 23/105 123/301 |
| 6,035,822 | A * | 3/2000 | Suzuki | F02B 23/104 123/276 |
| 6,116,211 | A * | 9/2000 | Suzuki | F02B 23/104 123/276 |
| 6,209,506 | B1 * | 4/2001 | Satou | F02F 1/242 123/193.5 |
| 6,308,682 | B1 * | 10/2001 | Ma | F02B 17/00 123/295 |
| 7,360,531 | B2 * | 4/2008 | Yohso | F02B 23/08 123/308 |
| 8,794,549 | B2 * | 8/2014 | Sakai | F02M 61/1853 239/504 |
| 2007/0056556 | A1 * | 3/2007 | Yohso | F02B 23/08 123/308 |
| 2011/0220739 | A1 * | 9/2011 | Sakai | F02M 61/1806 239/533.2 |
| 2016/0319729 | A1 * | 11/2016 | Sakai | F02B 23/10 |
| 2016/0319766 | A1 * | 11/2016 | Sakai | F02D 41/2467 |
| 2016/0326947 | A1 * | 11/2016 | Sakai | F02B 23/10 |

FOREIGN PATENT DOCUMENTS

| | | | | |
|---|---|---|---|---|
| JP | H03067015 | A | | 3/1991 |
| JP | 2004044427 | A * | 2/2004 | ........... Y02T 10/125 |
| JP | 2004044427 | A | | 2/2004 |
| JP | 2009-041397 | A | | 2/2009 |
| JP | 2012127218 | A | | 7/2012 |
| JP | 2013-113126 | A | | 6/2013 |

OTHER PUBLICATIONS

Roger Bywater, "DFV 1967 to Toyota 2009—a remarkable tale of progress", Jul. 31, 2011 (Jul. 31, 2011), XP055175129, 'Race Engine Technology' Jun. /Jul. 2011, Retrieved from the Internet: URL:http://www.jagweb.com/aj6eng/ret/index.php [retrieved on Mar. 10, 2015], 4 pages.

Anonymous, "Reverse Dome vs Dished Piston—p. 6—Yellow Bullet Forums", Nov. 26, 2012 (Nov. 26, 2012), XP055175161, Retrieved from the Internet: URL:http://www.yellowbullet.com/forum/showthread.php?t=527745&page=6 [retrieved on Mar. 10, 2015], p. 7.

T. Pfeffer et al., "Influence of Intake Tumble Ratio on General Combustion Performance, Flame Speed and Propagation at a Formula One Type High-Speed Research Engine," SAE Technical Paper, Mar. 7, 2002, XP055175203, ISSN: 0148-7191. (from JP OA Dec. 20, 2016).

* cited by examiner

INTAKE-EXHAUST DIRECTION

COMBUSTION CHAMBER STRUCTURE OF SPARK-IGNITION INTERNAL COMBUSTION ENGINE

CROSS-REFERENCE TO RELATED APPLICATIONS

This is a national phase application based on the PCT International Patent Application No. PCT/IB2014/002775 filed Dec. 15, 2014, claiming priority to Japanese Patent Application No. 2013-268772 filed Dec. 26, 2013, the entire contents of both of which are incorporated herein by reference.

BACKGROUND OF THE INVENTION

1. Field of the Invention

The invention relates to a combustion chamber structure of a spark-ignition internal combustion engine.

2. Description of Related Art

A spark-ignition internal combustion engine in which tumble flow is produced in a combustion chamber and is guided to the vicinity of an ignition plug is known in the art. For example, in a combustion chamber structure of this type of internal combustion engine as described in Japanese Patent Application Publication No. 2013-113126 (JP 2013-113126 A), an ignition plug region provided around an ignition plug hole, and four port regions provided around two intake ports and two exhaust ports are delimited or separated from each other by means of ridges, and each of the ignition plug region and the four ports regions is formed in a substantially semi-spherical shape that is concaved upward in the combustion chamber. With the combustion chamber structure, the tumble flow that collapses at around the compression top dead center can be concentrated in the vicinity of the ignition plug. Accordingly, the ignition performance can be improved, and the combustion efficiency can be enhanced.

SUMMARY OF THE INVENTION

In the meantime, the flow rate of the tumble flow changes when the engine speed changes. If the velocity of the tumble flow is increased with increase of the engine speed, the tumble flow becomes more likely to collapse in the compression stroke. If the tumble flow collapses, the flow rate of the tumble flow in the vicinity of a location where the ignition plug is installed is excessively reduced, and the ignition performance may deteriorate. Also, if the tumble flow collapses, an air/fuel mixture is unevenly or non-uniformly distributed immediately before ignition, which may result in uneven or non-uniform flame propagation after ignition.

The invention provide a combustion chamber structure of a spark-ignition internal combustion engine that produces tumble flow in a combustion chamber, wherein the tumble flow is less likely or unlikely to collapse.

A combustion chamber structure for a spark-ignition internal combustion engine according to one aspect of the invention includes a combustion chamber configured to produce tumble flow that swirls in an axial direction of a cylinder, an ignition plug disposed in a central portion of an upper wall of the combustion chamber, and a guide portion that protrudes from the upper wall of the combustion chamber. The guide portion is configured to guide airflow passing through the central portion of the combustion chamber in an intake-exhaust direction of the combustion chamber while dispersing the airflow around the guide portion.

With the above arrangement, the guide portion that protrudes from the upper wall of the combustion chamber makes it possible to curb collapse of the tumble flow in the compression stroke, which would otherwise be caused by increase of the velocity of the tumble flow. Also, the guide portion can eliminate non-uniformity in distribution of the air/fuel mixture immediately before ignition. Accordingly, uneven or non-uniform flame propagation after ignition can be favorably curbed.

In the combustion chamber structure according to the above aspect of the invention, the guide portion may be provided at a location where the ignition plug is installed. Also, the upper wall of the combustion chamber may have two intake ports and two exhaust ports, and the guide portion may have an outer periphery that starts at a point between the two intake ports, the outer periphery extends along outer edges of valve seats of the respective intake ports, the outer periphery bends at points between the intake ports and the exhaust ports, to be directed to between the two exhaust ports, and the outer periphery ends at a point between the two exhaust ports.

The guide portion may be provided on the intake side of the combustion chamber. However, if the guide portion is provided on the intake side of the combustion chamber, it may impede flow of intake air into the combustion chamber. If the guide portion is provided at the location where the ignition plug is installed, as described above, the intake air is allowed to smoothly flow into the combustion chamber. Also, in the case where two intake ports and two exhaust ports are provided in the upper wall of the combustion chamber, the outer periphery of the guide portion is preferably shaped as described above.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A combustion chamber structure of an internal combustion engine according to one embodiment of the invention will be described with reference to the drawings.

Figure 1:
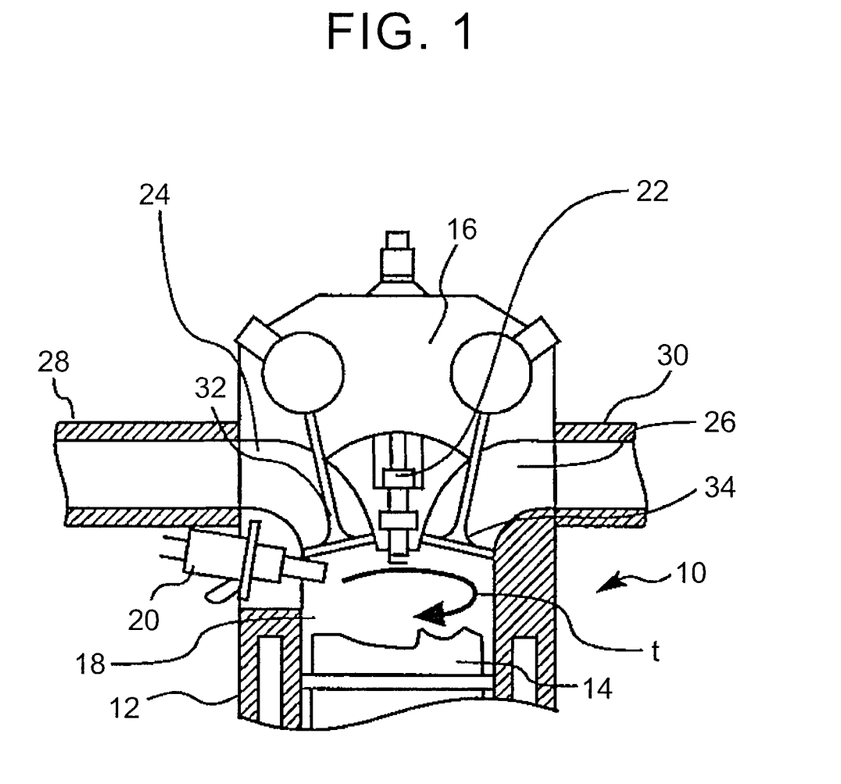
FIG. 1 is a schematic cross-sectional view of a combustion chamber of an internal combustion engine according to one embodiment of the invention.

FIG. 1 is a schematic cross-sectional view of a combustion chamber of the internal combustion engine according to the embodiment of the invention. As shown in FIG. 1, a piston 14 is provided in a cylinder 12 of the engine 10 such that the piston 14 can reciprocate in the cylinder 12 in sliding contact therewith. A cylinder head 16 is mounted on the cylinder 12. The combustion chamber 18 is defined by a bore wall of the cylinder 12, a top face of the piston 14, and a bottom of the cylinder head 16.

A fuel injection valve 20 for directly injecting fuel into the combustion chamber 18 is provided in the cylinder head 16. An ignition plug 22 for igniting an air/fuel mixture in the combustion chamber 18 is also provided in the cylinder head 16. Namely, the internal combustion engine 10 is an in-cylinder or direct injection type spark-ignition engine. The engine 10 may be a port injection type spark-ignition engine.

Intake ports 24 and exhaust ports 26 are formed in a lower surface of the cylinder head 16. The combustion chamber 18 communicates with an intake passage 28 via the intake ports 24, and communicates with an exhaust passage 30 via the exhaust ports 26. The intake ports 24 are formed in such a shape as to promote production of tumble flow of intake air as vertical flow that swirls in a direction indicated by arrow t in FIG. 1. An airflow control valve for effectively producing the tumble flow may be provided in the intake passage 28. An intake valve 32 is provided in each of the intake ports 24. An exhaust valve 34 is provided in each of the exhaust ports 26.

Figure 2:
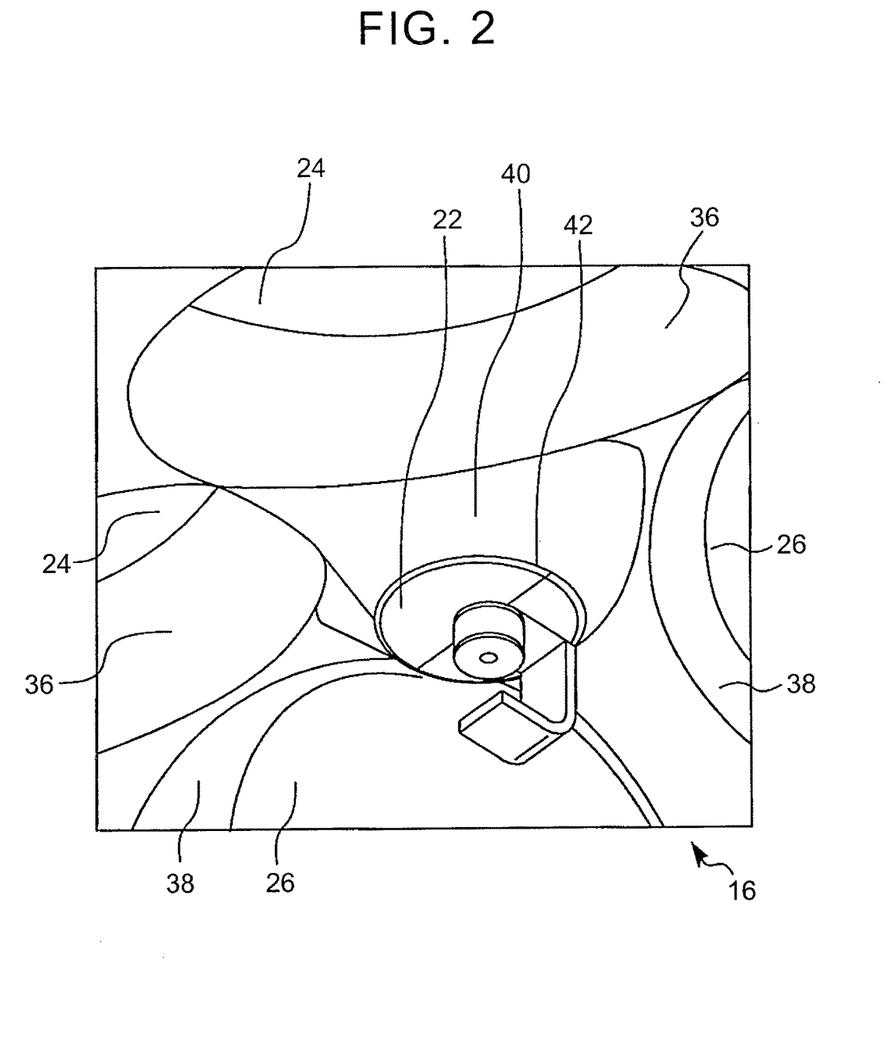
FIG. 2 is a perspective view of the combustion chamber as viewed from a piston side.

FIG. 2 is a perspective view of the combustion chamber 18 as viewed from the piston 14 side. As shown in FIG. 2, two intake ports 24 and two exhaust ports 26 are formed in the cylinder head 16. A valve seat 36 is embedded in an opening end of each of the intake ports 24. A valve seat 38 is embedded in an opening end of each of the exhaust ports 26. An inner circumferential surface of each of the valve seats 36, 38 defines a tapered bore whose diameter increases toward the combustion chamber 18. When the intake valves 32 of FIG. 1 rest on walls of the corresponding tapered bores, the intake ports 24 are closed. When the intake valves 32 are moved away from the walls of the tapered bores, the intake ports 24 are opened. The exhaust ports 26 are opened and closed in the same manner as the intake ports 24.

As shown in FIG. 2, a protrusion 40 that protrudes from the lower surface of the cylinder head 16 into the combustion chamber 18 is formed at a generally middle position of the opening ends of the four ports (namely, a generally central portion of an upper wall of the combustion chamber 18). The shape of the protrusion 40 will be described in detail with reference to FIG. 3 through FIG. 5. The ignition plug 22 is inserted and fitted in a plug hole 42 formed at around the center of the protrusion 40, and a distal electrode portion of the plug 22 is exposed to the interior of the combustion chamber 18.

Figure 3:
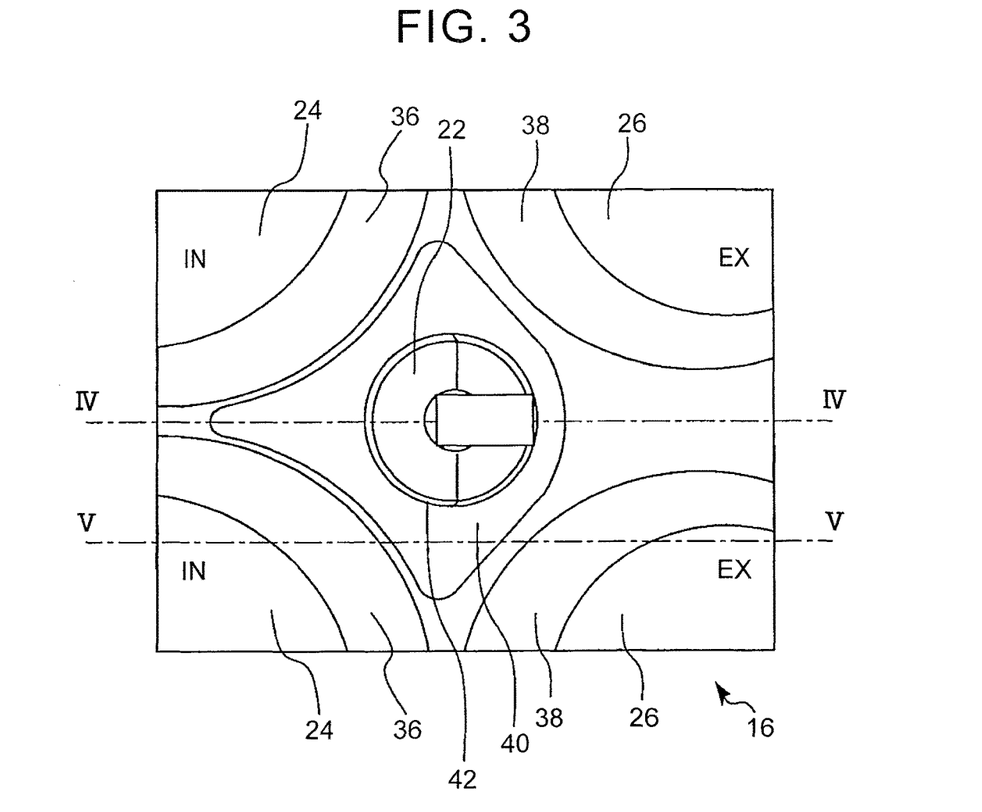
FIG. 3 is a plan view of the combustion chamber as viewed from the piston side.

FIG. 3 is a plan view of the combustion chamber 18 as viewed from the piston 14 side. As shown in FIG. 3, the protrusion 40 is shaped like a ginkgo leaf in cross-section, and its outer periphery, which starts at a point between the two intake ports 24, extends along outer edges of the respective valve seats 36, bends at points between the intake ports 24 and the exhaust ports 26, to be directed to between the two exhaust ports 26, and ends at a point between the exhaust ports 26. The width of the protrusion 40 is largest at its portions between the intake ports 24 and the exhaust ports 26, and is reduced toward its portion between the two intake ports 24, or its portion between the two exhaust ports 26.

Figure 4:
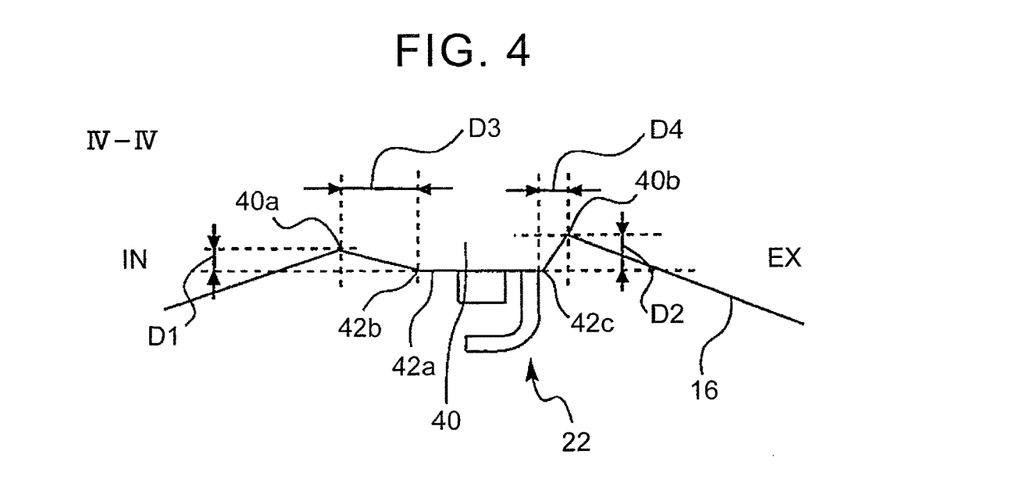
FIG. 4 is a IV-IV cross-sectional view of FIG. 3.

FIG. 4 is a IV-IV cross-sectional view of FIG. 3. Where a section line 42a of the opening end of the plug hole 42 is regarded as a reference line, the following will be understood with regard to two distances as measured in the axial direction of the cylinder. Namely, distance D1 between an outer edge 40a of the protrusion 40 closer to the intake ports 24 and the section line 42a is shorter than distance D2 between an outer edge 40b of the protrusion 40 closer to the exhaust ports 26 and the section line 42a. Namely, the protrusion 40 is shaped so as to protrude into the combustion chamber 18 to a larger extent at the intake ports 24 side, as compared with the exhaust ports 26 side. Also, the following will be understood with regard to two distances as measured in a direction perpendicular to the axis of the cylinder. Namely, distance D3 from the opening end 42b of the plug hole 42 to the outer edge 40a is longer than distance D4 from the opening end 42c of the plug hole 42 to the outer edge 40b. Namely, the protrusion 40 extends to a larger extent at the intake ports 24 side, as compared with the exhaust ports 26 side. This shape is also apparent from FIG. 3.

Figure 5:
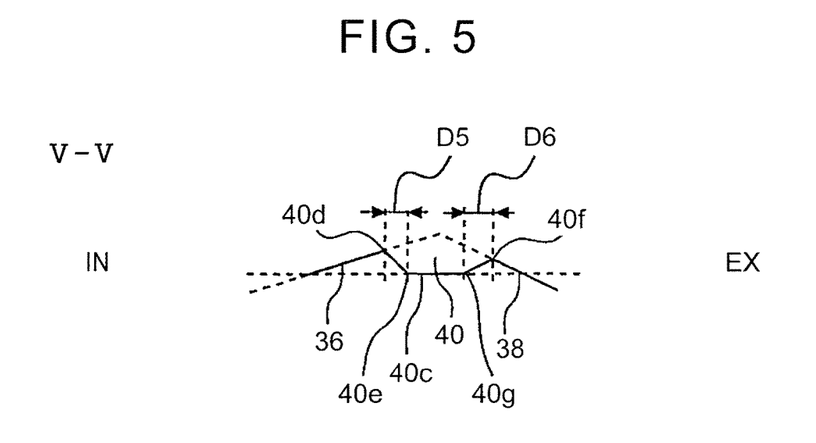
FIG. 5 is a V-V cross-sectional view of FIG. 3.

FIG. 5 is a V-V cross-sectional view of FIG. 3. Where a section line 40c parallel to the section line 42a of FIG. 4 is regarded as a reference line, the following will be understood with regard to two distances as measured in a direction perpendicular to the cylinder axis. Namely, distance D5 from an outer edge 40d of the protrusion 40 on the intake port 24 side to one end 40e of the section line 40c is shorter than distance D6 from an outer edge 40f of the protrusion 40 on the exhaust port 26 side to the other end 40g of the section line 40c. Namely, the protrusion 40 protrudes from the vicinity of the outer edge of the valve seat 36 into the combustion chamber 18 along the outer edge, on the intake port 24 side.

Figure 6:
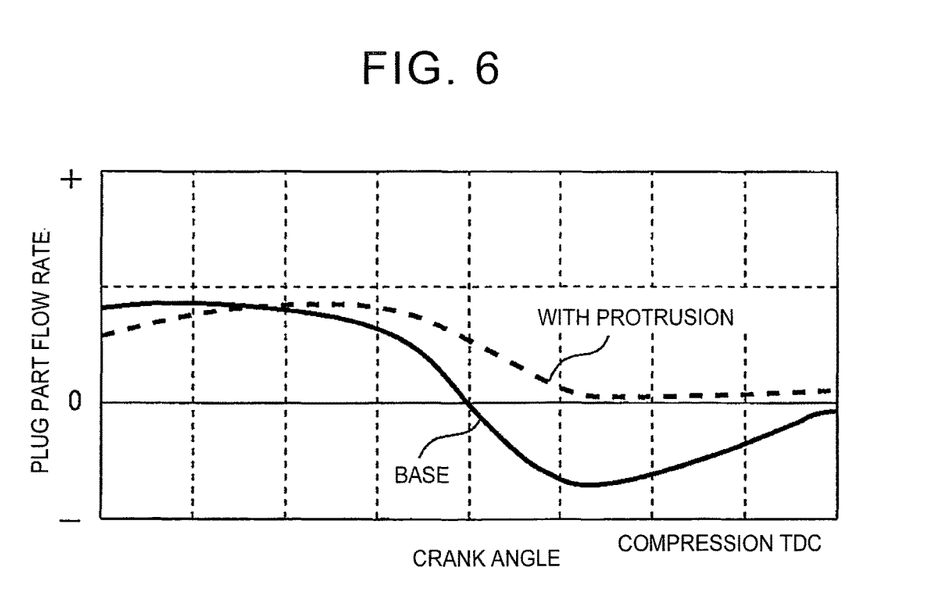
FIG. 6 is a view showing changes in, the gas flow rate at around the compression TDC.

Referring to FIG. 6 through FIG. 11, the effects based on the structure of the combustion chamber 18 will be explained. FIG. 6 shows changes in the gas flow rate at around the compression TDC. The graph of FIG. 6 is plotted by measuring the gas flow rate (plug part flow rate) in the combustion chamber, using a measurement instrument inserted in the plug hole, under operating conditions that the engine speed is 4000 rpm, and the throttle valve is fully opened (WOT: wide open throttle). In FIG. 6, the vertical axis indicates measurement value of the gas flow rate. More specifically, the measurement value takes a positive (+) value if the gas flows from the intake side to the exhaust side, and takes a negative (−) value if the gas flows from the exhaust side to the intake side.

A curve denoted as "BASE" in FIG. 6 represents the plug part flow rate measured in a combustion chamber for comparison having no protrusion 40. More specifically, the plug part flow rate takes positive values well before the compression TDC, but is lowered and takes negative values as the crank angle approaches the compression TDC. Namely, in the combustion chamber for comparison, the flow direction of the gas is reversed before the compression TDC. A curve denoted as "WITH PROTRUSION" in FIG. 6 represents the plug part flow rate in the combustion chamber 18 having the protrusion 40. More specifically, the plug part flow rate is lowered as the crank angle approaches the compression TDC, but still takes positive value even in the vicinity of the compression TDC. Namely, in the combustion chamber 18 of this embodiment, reversal of gas observed in the combustion chamber for comparison is curbed or prevented.

Figure 7:
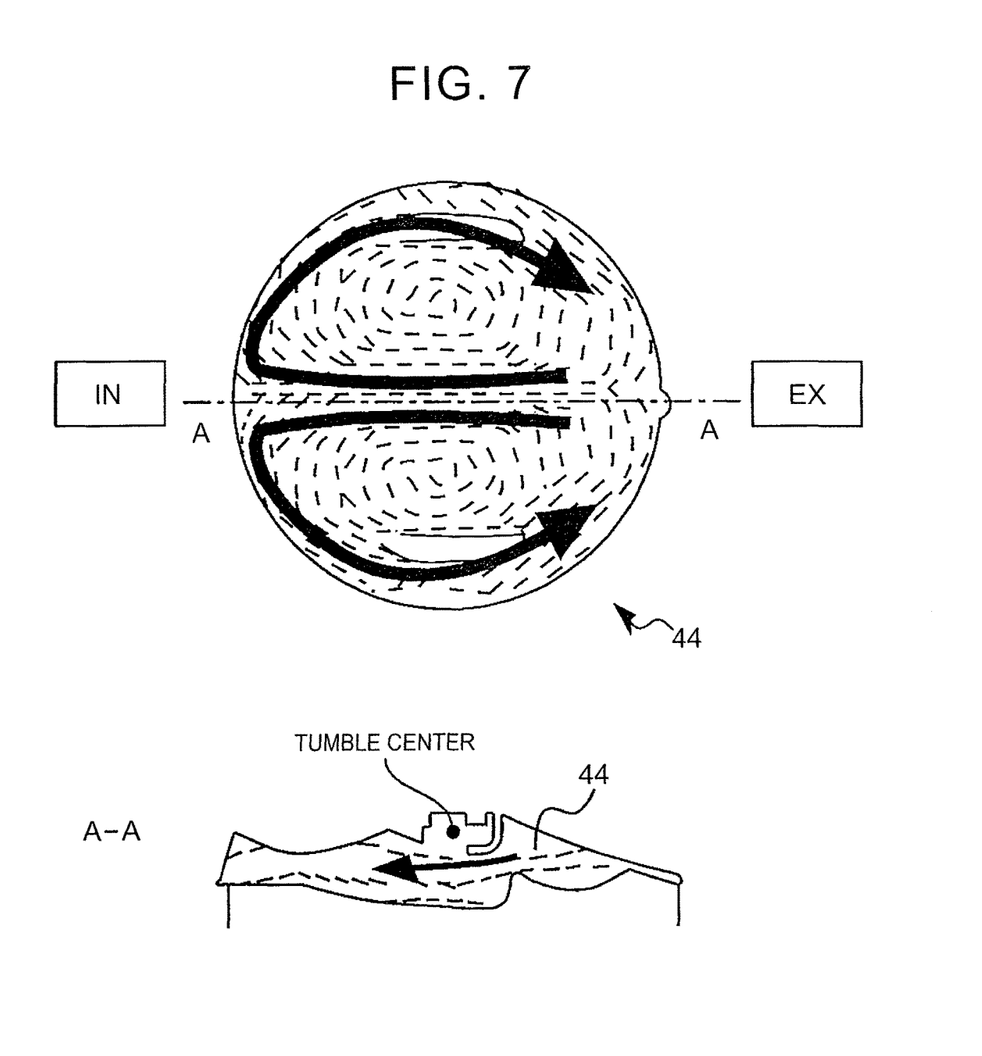
FIG. 7 is a view showing airflow distribution at the compression TDC in a combustion chamber for comparison.

The gas flow direction is reversed in the combustion chamber for comparison because ω tumble flow is produced. The w tumble flow will be explained with reference to FIG. 7 through FIG. 9. FIG. 7 shows airflow distribution at the compression TDC in the combustion chamber for comparison. As shown in FIG. 7, swirl flow having two axes of rotation is formed in the combustion chamber 44 for comparison. As shown in an A-A cross-sectional view in a lower section of FIG. 7, the center (tumble center TC) of the above-described airflow is formed in the vicinity of the ignition plug.

The airflow as described above is formed for the following reason. Namely, two streams of intake air flowing from the two intake ports in the intake stroke join together into one big tumble flow immediately after flowing into the combustion chamber 44, and the tumble flow swirls in the axial direction of the cylinder (vertical direction) in the combustion chamber 44. If the engine speed is low, the shape of the vertical swirl flow is maintained. However, as the engine speed increases, the velocity of the vertical swirl flow increases, and airflow in the intake-exhaust direction around the center of the combustion chamber 44 becomes stronger. As a result, the vertical swirl flow collapses in the compression stroke, and turns into swirl flow having two axes of rotation. Since the trace of the swirl flow into which the vertical flow turned has an ω (omega) shape, as viewed from above the combustion chamber 44, the swirl flow is called "ω tumble flow" in this specification.

Figure 8:
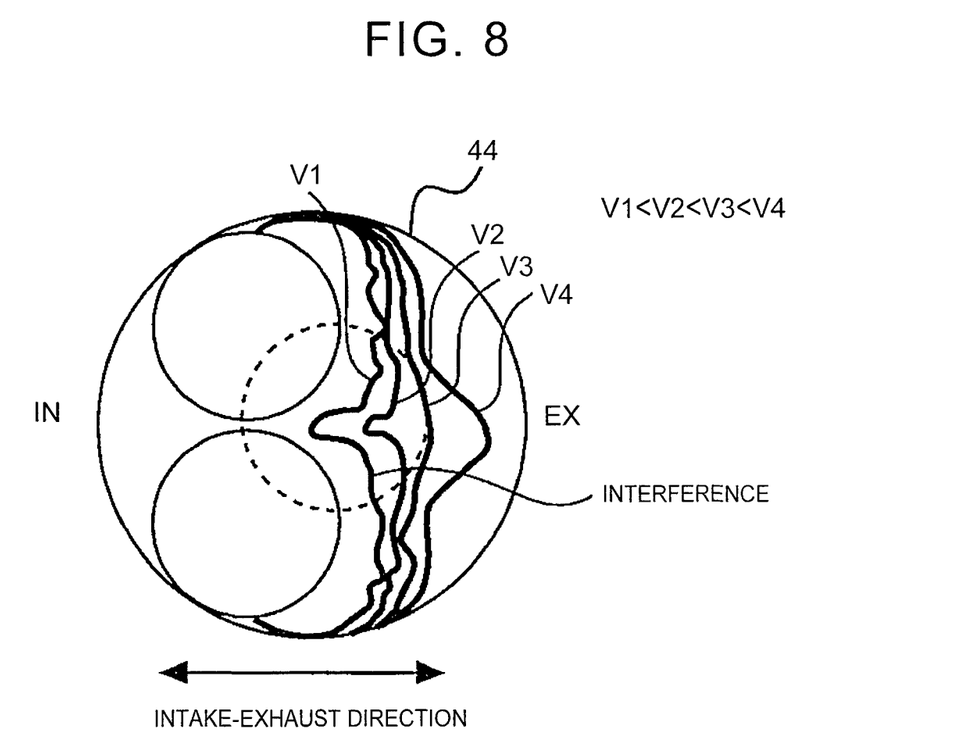
FIG. 8 is a view showing velocity distribution of airflow at the compression TDC in the combustion chamber for comparison.

FIG. 8 shows the velocity distribution of the airflow at the compression TDC in the combustion chamber 44. As shown in FIG. 8, in the central portion of the combustion chamber 44, the airflow velocities V are distributed at relatively wide intervals in the intake-exhaust direction. On the other hand, the airflow velocities V are distributed at relatively narrow intervals, in a peripheral portion of the combustion chamber 44. This is because airflows concentrate in the vicinity of the central portion of the combustion chamber 44, and interfere with each other, so that airflow components are generated in a direction perpendicular to the intake-exhaust direction.

Figure 9:
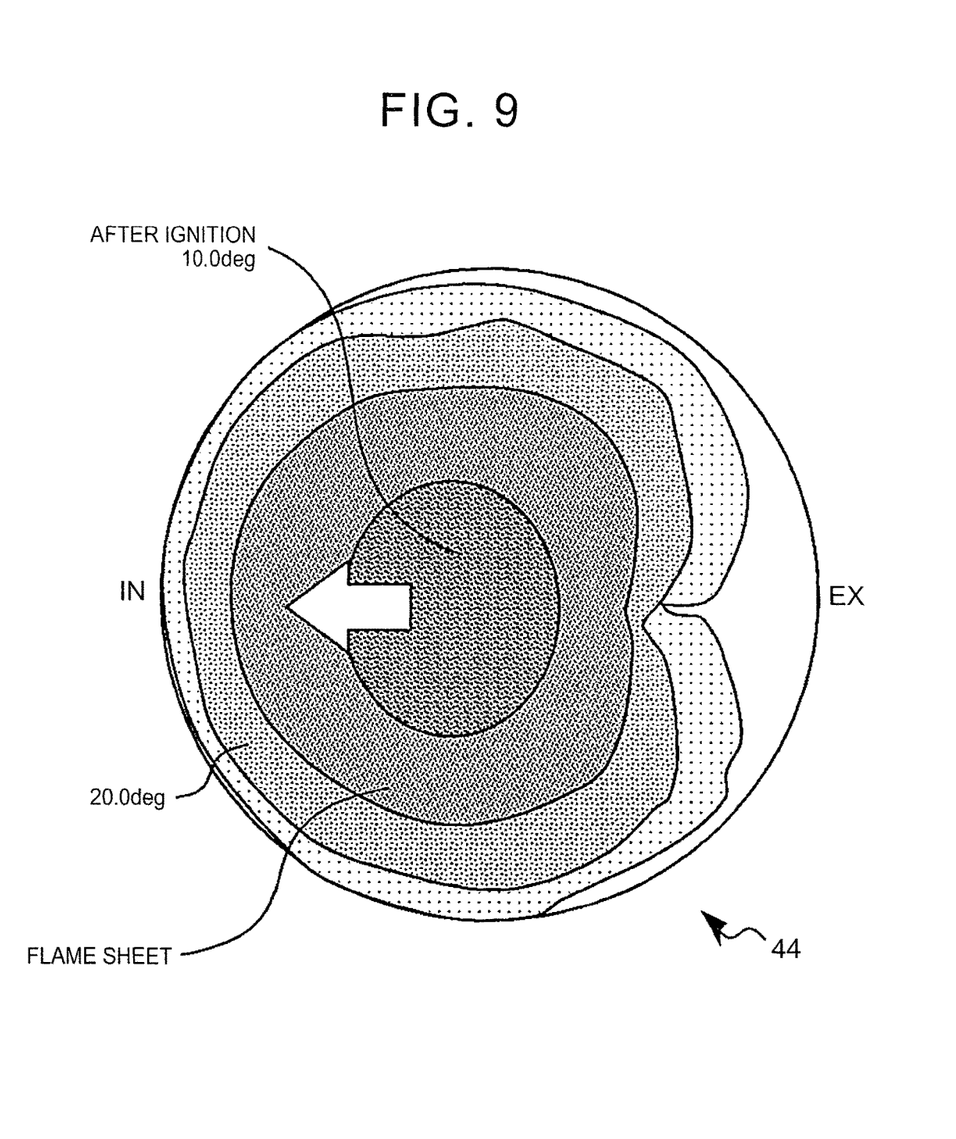
FIG. 9 is a view showing flame propagation in the combustion chamber for comparison with a lapse of time.

If the ω tumble flow is formed in the combustion chamber, flame propagation after ignition is deflected, namely, flame propagates unevenly after ignition. FIG. 9 shows flame propagation in the combustion chamber 44 with a lapse of time. In the example of FIG. 9, the ignition timing is set to the compression TDC. As shown in FIG. 9, a flame initiated in a central portion of the combustion chamber 44 propagates toward a side wall of the combustion chamber 44 (i.e., a wall of a cylinder bore) while expanding in magnitude. However, if the ω tumble flow is formed, gas flows from the exhaust side to the intake side, and therefore, the flame is not formed in the shape of an exact circle, but is distorted in shape. This may result in occurrence of knocking, or delay in combustion of fuel.

Figure 10:
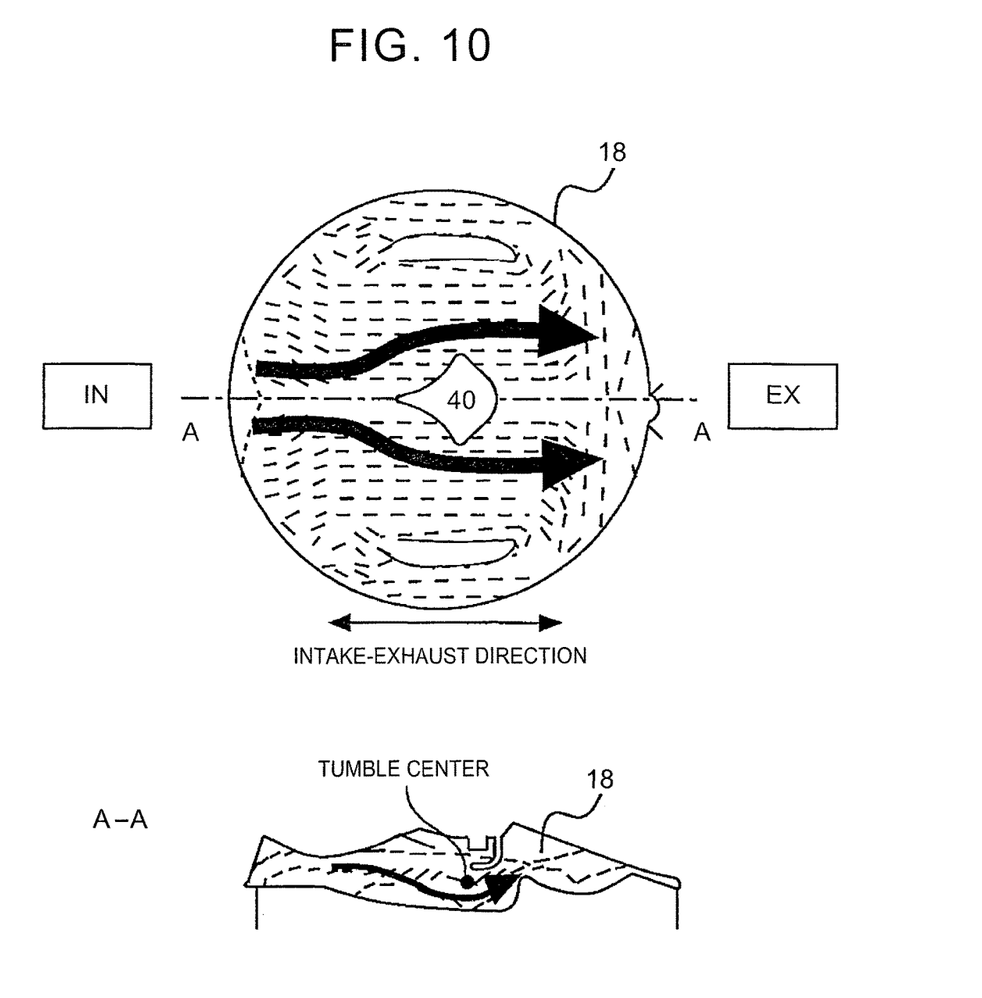
FIG. 10 is a view showing airflow distribution at the compression TDC in the combustion chamber of the embodiment of the invention.

In this respect, according to the structure of the combustion chamber 18 having the protrusion 40, the ω tumble flow is less likely or unlikely to be formed. FIG. 10 shows airflow distribution at the compression TDC in the combustion chamber 18. As shown in FIG. 10, airflows in the combustion chamber 18 are distributed along the intake-exhaust direction. The swirl flow formed in the combustion chamber 44 and having two axes of rotation is not observed. This is because the airflows passing through the central portion of the combustion chamber 18 are dispersed by the protrusion 40 to travel around the protrusion 40. As shown in an A-A cross-sectional view in a lower section of FIG. 10, the center of the airflows (tumble center) is formed to be closer to the center of the combustion chamber 18 than to the distal end of the ignition plug 22. This is because the airflows are formed so as to avoid the protrusion 40, as indicated by arrows in FIG. 10.

Figure 11:
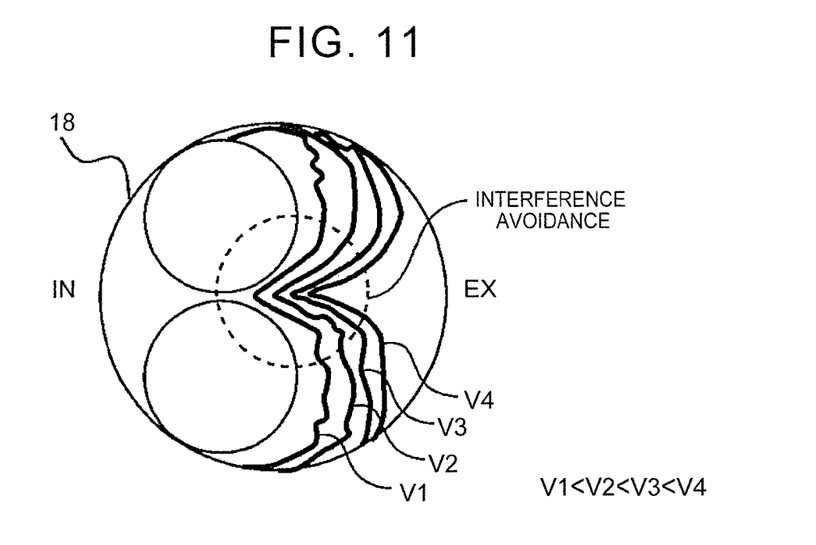
FIG. 11 is a view showing velocity distribution of airflow at the compression TDC in the combustion chamber of the embodiment.

FIG. 11 shows the velocity distribution of the airflow at the compression TDC in the combustion chamber 18. As shown in FIG. 11, the airflow velocities V are distributed at substantially equal intervals, in the combustion chamber 18. The reason is similar to the reason as described above with reference to FIG. 10.

Figure 12:
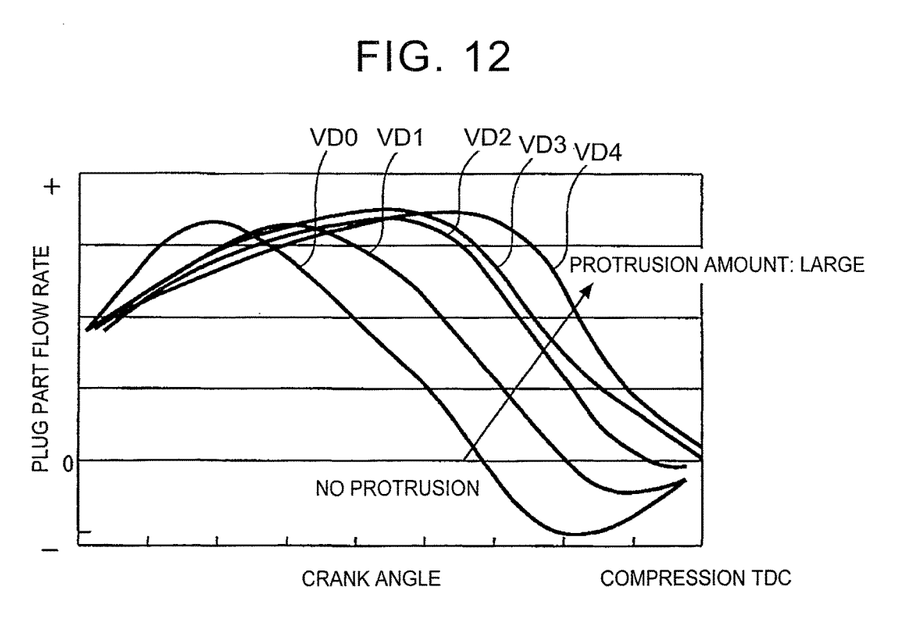
FIG. 12 is a view showing the relationship between the protrusion amount of the protrusion and the plug part flow rate.
Figure 13A:
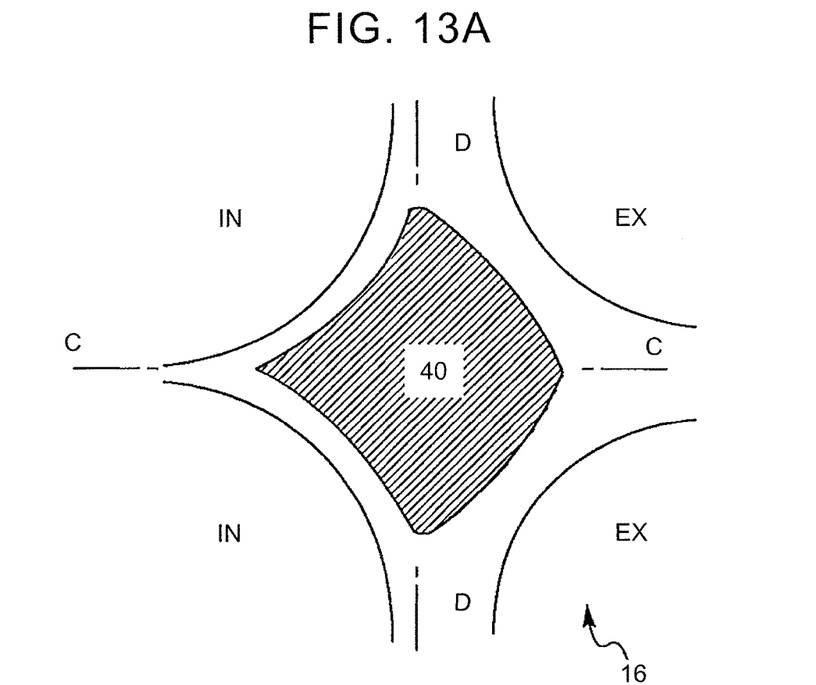
FIG. 13A is a schematic view of the protrusion.
Figure 13B:
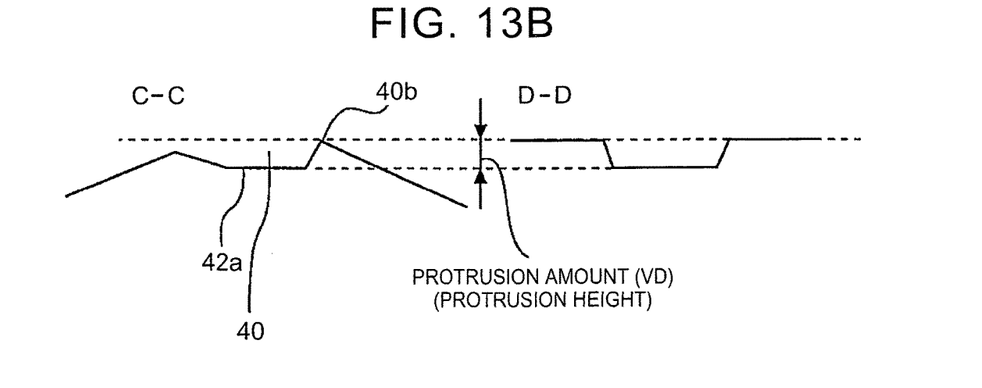
FIG. 13B is a cross-sectional view of the protrusion.
Figure 14:
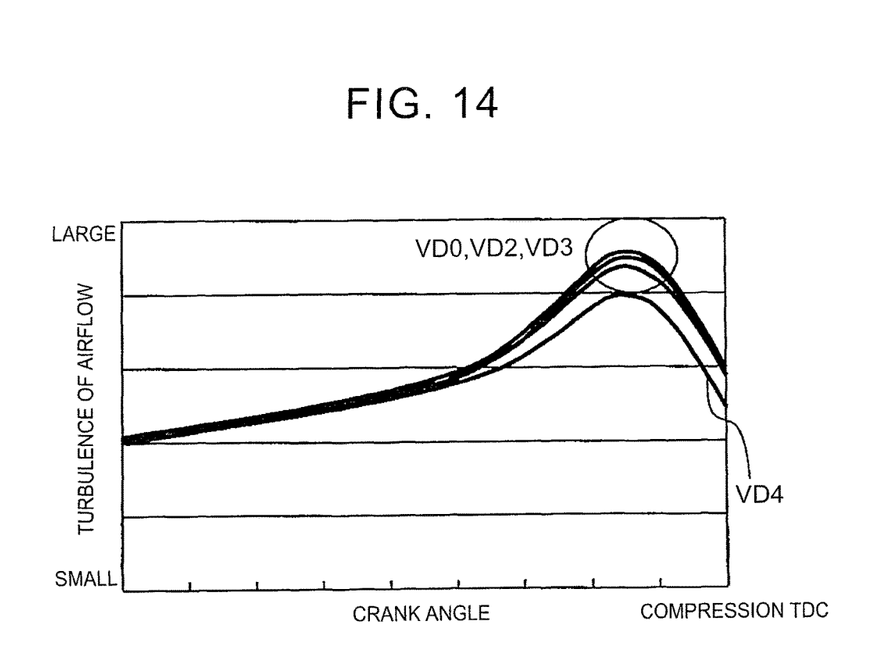
FIG. 14 is a view showing changes in the turbulence of airflow at around the compression TDC.

Referring to FIG. 12 through FIG. 14, the protrusion amount of the protrusion 40 will be described. FIG. 12 shows the relationship between the protrusion amount of the protrusion 40 and the plug part flow rate. FIG. 12 is plotted by a method similar to that of FIG. 6. A curve denoted as "NO PROTRUSION" in FIG. 12 represents the plug part flow rate measured in the combustion chamber for comparison having no protrusion 40, like the curve denoted as "BASE" in FIG. 6. In this case, the gas flow direction is reversed before the compression TDC. If the protrusion amount is increased from "NO PROTRUSION", the reversal of the gas flow direction is still observed when the protrusion amount is equal to VD1, VD2, but no reversal of the gas flow direction occurs when the protrusion amount is equal to VD3, VD4. Thus, the reversal of the gas flow direction is eliminated if the protrusion amount VD is increased.

The protrusion amount of FIG. 12 is defined by FIG. 13A and FIG. 13B. FIG. 13A is a schematic view of the protrusion 40, and FIG. 13B is a cross-sectional view thereof. As shown in a C-C cross-section and a D-D cross-section of FIG. 13B, the distance between the section line 42a of the opening end of the plug hole 42, and the outer edge 40b of the protrusion 40 on the exhaust ports 26 side, as measured in the axial direction of the cylinder, is defined as the protrusion amount VD.

FIG. 14 is a view showing changes in the turbulence of the airflow at around the compression TDC. As shown in FIG. 14, the turbulence of the airflow in the combustion chamber is reduced as the protrusion amount VD increases. If the turbulence of the airflow is small, the airflow is non-uniformly or unevenly distributed in the combustion chamber, and the flame propagation is affected by the non-uniform airflow distribution. Accordingly, it is not always desirable to simply increase the protrusion amount VD of the protrusion 40. From this point of view, it is preferable to set the protrusion amount of the protrusion 40 to such a value that can eliminate reversal of the gas flow direction in the combustion chamber, but does not reduce the airflow turbulence.

As described above, according to the structure of the combustion chamber 18, the ω tumble flow is less likely or unlikely to be formed in the combustion chamber. Accordingly, distortion of the flame in the combustion chamber can be corrected, and occurrence of knocking can be favorably curbed. Also, reduction of the combustion speed of the fuel can be curbed. Therefore, even in the case where EGR gas having lower ignitability than new air is introduced into the combustion chamber, a problem, such as misfiring, is less likely or unlikely to occur. Accordingly, when the internal combustion engine 10 is equipped with an EGR system, a larger quantity of EGR gas can be introduced into the engine 10.

Figure 15:
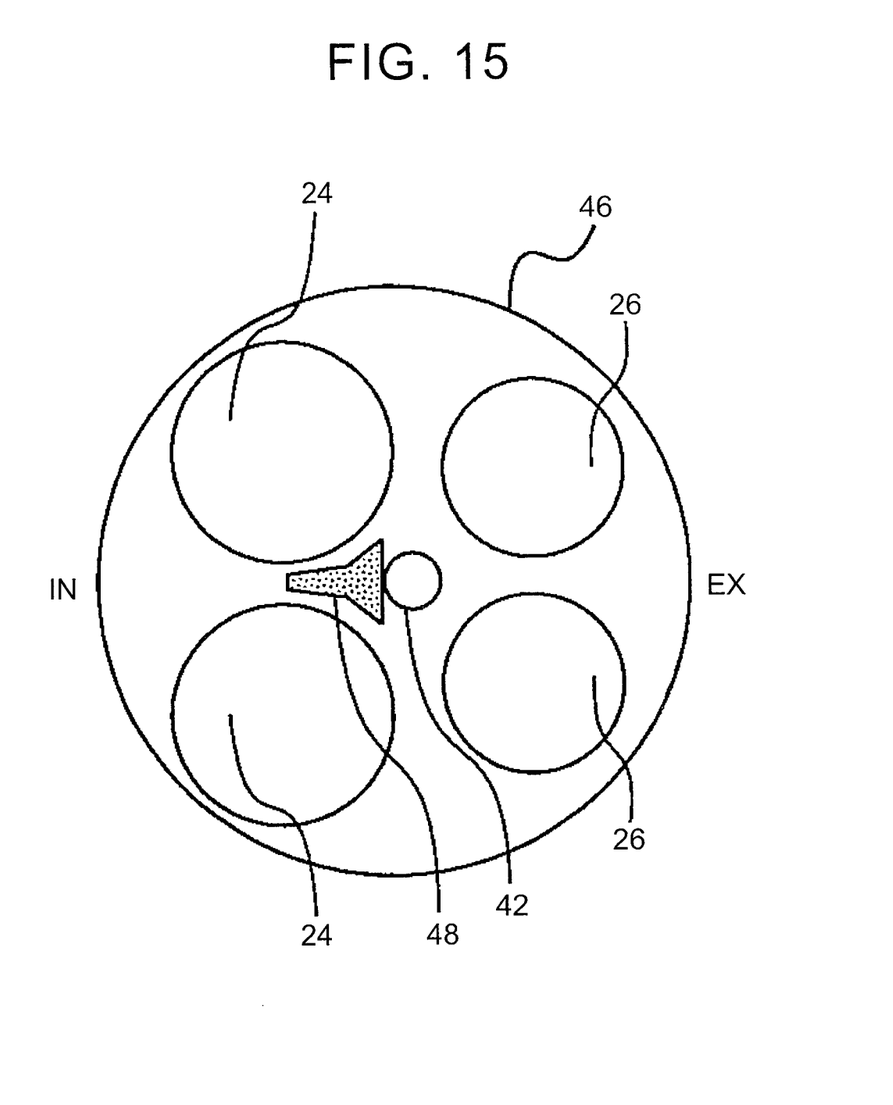
FIG. 15 is a view showing a modified example of the embodiment of the invention.

While the protrusion 40 is provided so as to surround the plug hole 42 in the above-described embodiment, the location at which the protrusion 40 is formed is not limited to this location. FIG. 15 shows a modified example of the above embodiment. In a combustion chamber 46 shown in FIG. 15, a protrusion 48 is formed at a location closer to the intake ports 24 than the plug hole 42. The protrusion 48 functions as a partition wall that disperses airflow passing through a central portion of the combustion chamber 46, around the protrusion 48. Thus, the protrusion may be formed at any location or may be formed in various shapes provided that the protrusion can guide the airflow passing through the central portion of the combustion chamber 46 toward the exhaust ports 26 while dispersing the airflow around the protrusion.

In the above-described embodiment, the protrusion 40 corresponds to "guide portion" according to the invention.

What is claimed is:

1. A combustion chamber structure for a spark-ignition internal combustion engine, the combustion chamber structure comprising:
    a combustion chamber configured to produce tumble flow that swirls in an axial direction of a cylinder;
    an ignition plug disposed in a central portion of an upper wall of the combustion chamber; and
    a guide portion that protrudes from the upper wall of the combustion chamber so as to surround the ignition plug, the guide portion extending to a larger extent at an intake port side as compared with at an exhaust port side, the guide portion being configured to guide airflow passing through the central portion of the combustion chamber in an intake-exhaust direction of the combustion chamber while dispersing the airflow around the guide portion,
    wherein the ignition plug is inserted in a plug hole formed in the guide portion,
    wherein a distance between an outer edge of the guide portion at the intake port side and a section line of an opening end of the plug hole in the axial direction of the cylinder is shorter than a distance between an outer edge of the guide portion at the exhaust port side, and the section line in the axial direction of the cylinder, and
    wherein the guide portion protrudes into the combustion chamber to a larger extent at the intake port side, as compared with the exhaust port side.

2. The combustion chamber structure according to claim 1, wherein:
    the upper wall of the combustion chamber has two intake ports and two exhaust ports; and
    the guide portion has an outer periphery that starts at a point between the two intake ports, the outer periphery extends along outer edges of valve seats of the respective intake ports, the outer periphery bends at points between the intake ports and the exhaust ports, to be directed to between the two exhaust ports, and the outer periphery ends at a point between the two exhaust ports.

* * * * *